Nov. 19, 1957 D. D. WILCOX, JR 2,813,678

ELECTRONIC DIFFERENTIAL DIGITAL COMPUTER

Filed Nov. 27, 1951 4 Sheets-Sheet 1

Dwight D. Wilcox, Jr.
INVENTOR.

BY G. D. O'Brien

ATTORNEYS

Nov. 19, 1957 D. D. WILCOX, JR 2,813,678

ELECTRONIC DIFFERENTIAL DIGITAL COMPUTER

Filed Nov. 27, 1951 4 Sheets-Sheet 2

| STAGE 1 COUNT | 1A | 1B | | STAGE 2 2A | 2B | | STAGE 4 4A | 4B | |
|---|---|---|---|---|---|---|---|---|---|
| 0 | X | O | | X | O | | X | O | |
| 1 | O | X | | X | O | | X | O | |
| 2 | X | O | PULSE → | O | X | | X | O | |
| 3 | O | X | | O | X | | X | O | |
| 4 | X | O | PULSE → | X | O | PULSE → | O | X | |
| 5 | O | X | | X | O | | O | X | |
| 6 | X | O | PULSE → | O | X | | O | X | |
| 7 | O | X | | O | X | | O | X | |
| 8 or 0 | X | O | PULSE → | X | O | PULSE → | X | O | PULSE → |

"O" = CONDUCTING
"X" = CUT OFF

Dwight D. Wilcox, Jr.
INVENTOR.
BY [signature]
ATTORNEYS

Dwight D. Wilcox, Jr.
INVENTOR.
BY [signature]
ATTORNEYS

Nov. 19, 1957 D. D. WILCOX, JR 2,813,678

ELECTRONIC DIFFERENTIAL DIGITAL COMPUTER

Filed Nov. 27, 1951 4 Sheets-Sheet 4

Dwight D. Wilcox, Jr.
INVENTOR.

BY G. D. O'Brien

ATTORNEYS

United States Patent Office 2,813,678

Patented Nov. 19, 1957

2,813,678

ELECTRONIC DIFFERENTIAL DIGITAL COMPUTER

Dwight D. Wilcox, Jr., Rochester, N. Y., assignor, by mesne assignments, to the United States of America as represented by the Secretary of the Navy Application November 27, 1951, Serial No. 258,372

9 Claims. (Cl. 235—92)

This invention relates generally to electronic digital computers and more particularly to electronic apparatus for computing the difference between the number of impulses received over each of a pair of channels. The computer of the invention is an improvement over the electronic differential digital computer disclosed in my cofiled application Serial No. 258,371, filed November 27, 1951, now Patent No. 2,754,059, dated July 10, 1956, and is similar thereto in that it includes a counter adapted to be triggered in the forward direction by pulses over one input channel and in the reverse direction by pulses over a second input channel and means to detect when the differential in the number of pulses over said channels is a predetermined number. In common with the computer of my cofiled application, the present invention accomplishes reverse counting, i. e., subtraction, by adding into the counter a number one less than its capacity. However, the operation of adding a number one less than capacity is accomplished in an entirely different manner, permitting the accumulation of much larger differentials and at much higher speed.

It is an object of the invention to provide an improved electronic digital computer which is adapted to detect when the difference in the number of pulses received over each of a pair of input channels is a predetermined number and to give an actuation according to the polarity of said difference. It is a further object of the invention to provide an improved electronic computing device operable either forwardly or reversely in which it is unnecessary to utilize switching means between stages to select whether an addition or a subtraction operation is to be accomplished. It is a still further object of the invention to provide an electronic differential computer adapted to count forward on signals over one input channel and backward on signals over a second input channel without changing the coupling between stages of the counter.

It is also an object of the invention to provide an improved digital computer which is capable of high counting speeds in both the forward and reverse direction. It is a further object of the invention to provide such a computer which is capable of computing large differentials and which does not require delicate adjustments to maintain the accuracy of the back count. It is a still further object of the invention to provide such an electronic differential computer which requires only a minimum number of tubes and electronic components, has an extremely low power consumption, and is readily adaptable to mass assembly.

Another object of the invention is to provide a method and apparatus for pulsing the counter one less than its capacity in order to accomplish subtraction. It is an object of the preferred embodiment of the invention to provide a circuit adapted when actuated by a single pulse to trigger each stage of the counter in order to accomplish subtraction. It is a further object of the preferred embodiment of the invention to provide such a circuit which is adapted to sequentially trigger each stage at such intervals as to prevent interference with the triggering (or carry-over) pulses between stages. It is also an object of the preferred embodiment of the invention to provide a back count triggering delay circuit adapted when actuated by a single pulse to sequentially trigger the counter stages in a direction opposite to the forward counting direction of the counter and to delay said triggering pulses so as to prevent jamming by the simultaneous arrival at a stage of two triggering pulses.

It is a still further object of the invention to provide a delay circuit for delivering single pulses sequentially at fixed time intervals over each of a plurality of output leads when triggered by a single input pulse.

In accomplishing the objects of the invention, a plurality or number "$n$" of bistable ring stages, i. e., each stage being stable in two positions of equilibrium, are connected in cascade to provide a counter chain in which each digital place in the binary system of numeration is represented by a stage. In the preferred embodiment of the invention, each stage comprises a bistable multivibrator, or "flip-flop" circuit, which is a modification of the well-known Eccles-Jordan circuit and which includes a pair of triodes in which the grid of the first triode is coupled to the anode of the second through a network comprising a parallel connected resistor and capacitor, and the grid of the second triode is similarly coupled to the anode of the first triode. Each triode has a stable condition of conductivity and a stable cut-off condition. Such a two-tube regenerative circuit which can exist in either of two stable states and change rapidly from one state to the other is conventionally termed a "multivibrator"; when two triggers are required to perform a complete cycle it is "bistable." The flip-flop circuits are cascaded through coupling means which allows each bistable multivibrator stage to be triggered from the stage immediately preceding it and only on triggering pulses of one polarity. The computer of the invention has $2^n$ unique positions, i. e., the counter has a capacity of $2^n$, where $n$ is the number of stages of bistable multivibrators. Counting in the forward direction is accomplished by triggering the first bistable multivibrator once for each pulse received over the first input channel.

Triggering the counter circuit one less than its capacity in order to accomplish subtraction is effected by triggering each stage once. If the input triggering pulses do not interefere with the pulses between stages, the equilibrium condition of the counter represents a condition one less in count than before all the stages are triggered. Since the sum of the binary numbers represented by the trigger circuit stages is (for the general case)

$$1+2+4+8\ \ldots\ 2^{n-2}+2^{n-1}=2^n-1$$

pulsing every stage is equivalent to pulsing the counter one less than its capacity, or to subtracting one. Delay means are provided to prevent jamming by the simultaneous arrival of an input pulse and a carry-over pulse from a previous stage. In the preferred embodiment of the invention this delay means comprises a novel backcount triggering delay circuit which produces a plurality of pulses separated by fixed time intervals when a single impulse is received over the second input channel. A plurality of cascaded triggering circuits, one associated with each stage and each including an electron discharge tube biased beyond cut-off, are coupled through differentiating means capable of distorting a pulse of one polarity into a pulse having both a positive and a negative lobe. The anode of the electron discharge tube of each circuit is coupled to its associated computer stage. When the first triggering circuit is pulsed, the resulting negative pulse in the anode circuit of its tube is differentiated into a wave having a leading negative lobe, to which the tube of the succeeding triggering circuit is unresponsive, and a trailing positive lobe which pulses this tube. The word "pulse" as a verb is used in the sense of "to trigger" or to render conductive by driving the control grid above cut-off for the duration of the impulse.

If pulses are applied alternately to the two input channels, the computer does not progress forward since the total of two successive pulses returns the counter to its original position. If more pulses are received over one channel than over the other, the count proceeds forward or backward from 0, depending upon which channel furnishes the most pulses. Digit selecting means controlled by the conducting or cut-off condition of the triodes are utilized to detect when the difference between the number of pulses received over the input channels is a predetermined number and to give an electrical actuation according to which channel furnishes the most pulses. Means for detecting when a predetermined differential smaller than half the capacity is accumulated, as well as a means for resetting the counter to zero, are similar to those disclosed in my aforementioned cofiled application.

The invention will be described by reference to the accompanying drawing in which.

Figure 1:
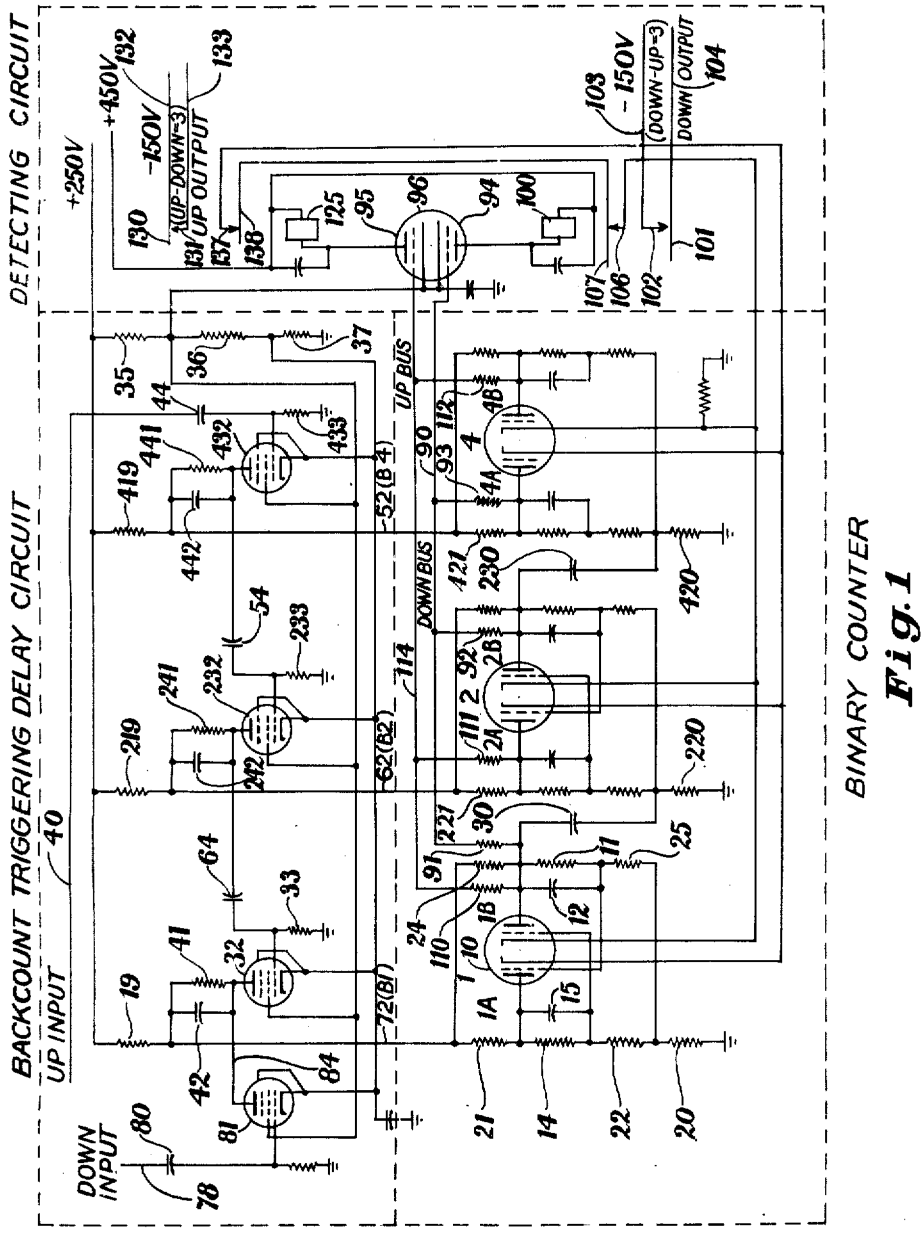
Fig. 1 is a circuit diagram of the preferred embodiment of the invention.
Figures 2, 3:
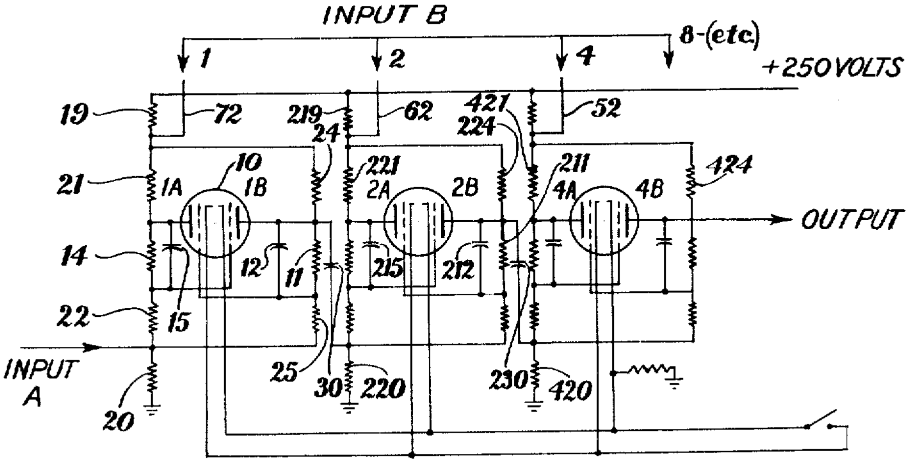
Fig. 2 shows the binary counter circuit of Fig. 1.
Fig. 3 is a table schematically illustrating the pulses between stages during forward counting in the 3-stage binary counter of Fig. 2.
Figure 5:
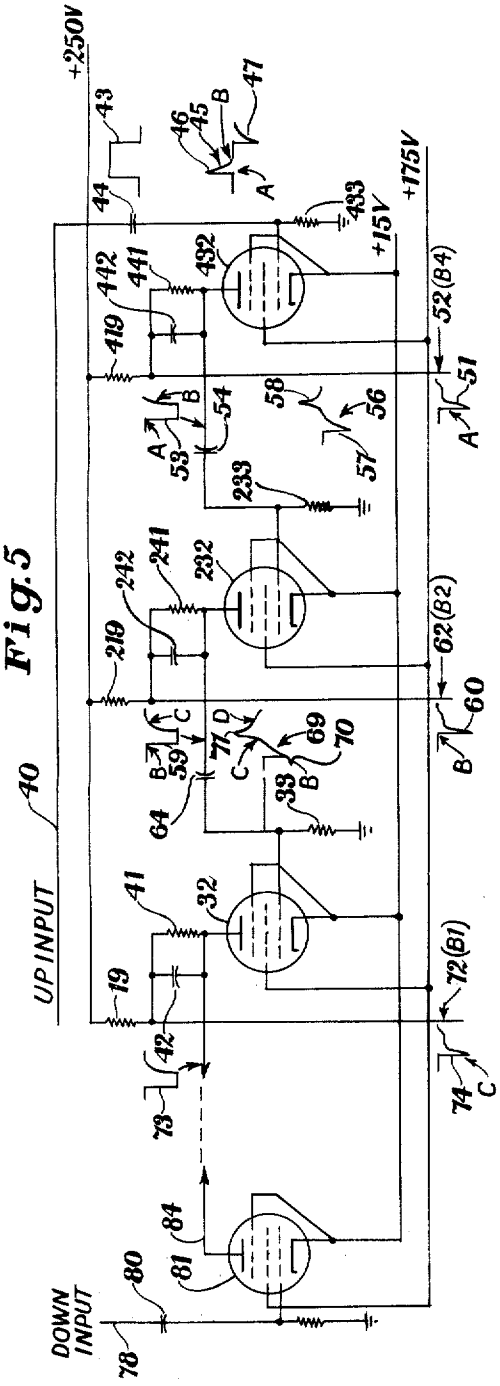
Fig. 5 shows the back count triggering delay portion of Fig. 1 which is adapted when pulsed to sequentially trigger each stage at intervals which prevent jamming of triggering and carry-over pulses.
Figure 6:
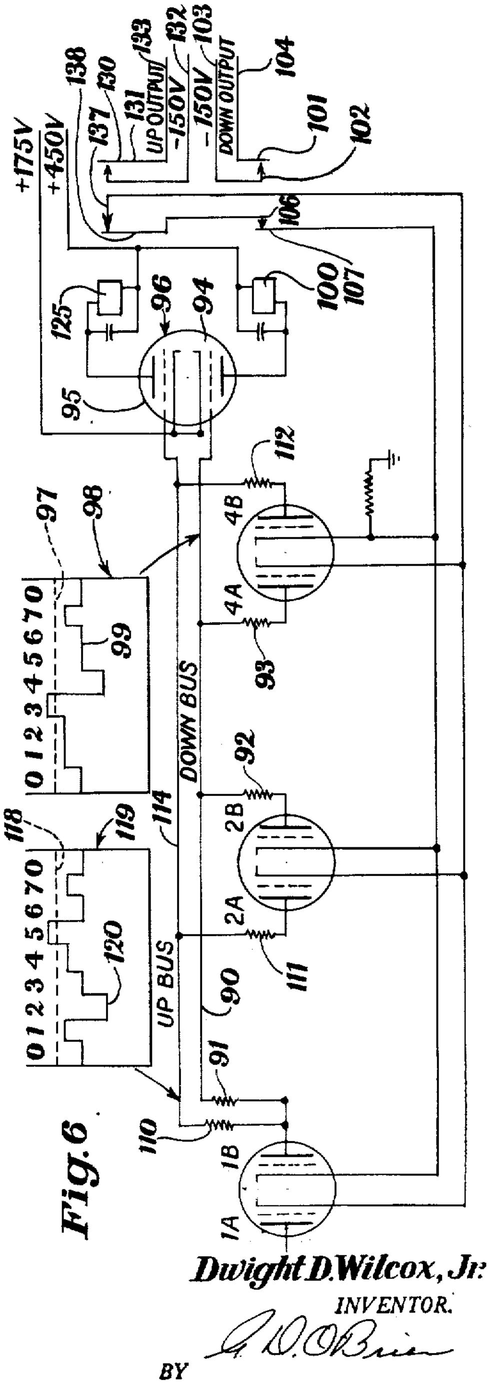
Fig. 6 shows the detecting portion portion of Fig. 1 which is adapted to give an output pulse and to reset the counter to 0 when a predetermined differential is accumulated.

A circuit diagram of the preferred embodiment of the invention is shown in Fig. 1, and the binary counter portion of this circuit, the backcount triggering delay portion, and the detecting portion are shown in Figs. 2, 5 and 6 respectively. The counting chain circuit of the computer, which may be more readily seen by reference to Fig. 2, comprises a plurality of bistable multivibrator stages, with each stage comprising a first and a second cross-coupled grid-controlled triode having a stable condition of conductivity and a stable cut-off condition. The stages are substantially identical and similar to the bistable multivibrator stages disclosed in my aforementioned cofiled application. Stage 1 will be detailed with the understanding that the succeeding stages differ only where specifically designated. The two triodes 1A and 1B of the first bistable multivibrator trigger circuit are contained within a single envelope such as a twin triode 2C51 tube. The grid of the triode 1A is coupled to the anode of the triode 1B through a network comprising a parallel connected resistor 11 and capacitor 12 and the grid of the triode 1B is similarly coupled to the anode of the triode 1A through a parallel connected resistor 14 and capacitor 15. The resistor 19 having one side connected to the 250-volt positive anode supply and a resistance 20 having one side connected to electrical ground are common to both a voltage dividing network associated with triode 1A including two resistances 21 and 22 in series with the resistance 14 and to a voltage dividing network associated with triode 1B including two resistances 24 and 25 in series with the resistance 11. One stable condition of the first bistable multivibrator stage exists when triode 1A is conducting and triode 1B is cut off; the second stable condition exists when triode 1B is conducting and triode 1A is cut off. When a triggering pulse cuts off a conducting tube, the triodes then reverse their functions and remain in the new condition until a second pulse stops the flow of plate current in the conducting tube. The triode which is cut off has a high anode potential and maintains the grid of the other triode in the conducting region; similarly, the anode voltage of the conducting tube is low and maintains the grid of the cut-off tube in the nonconducting region. The binary counter of the preferred embodiment of the invention includes three stages of bistable multivibrators respectively designated 1, 2, and 4, in representation of their corresponding numerical values in the counting cycle. Triggering impulses impressed across an impedance common to the triodes 1A and 1B flip the bistable multivibrator from one condition to the other. In the preferred embodiment of the invention this impedance may be either the common resistance 19 in the anode supply circuit or the common resistance 20 in the grid circuits of the triodes 1A and 1B. Thus trigger pulses may be furnished either over the input A lead (see Fig. 2) and impressed across the common impedance 20 or over the input B-1 lead and applied at the junction of the resistance 19 with the resistances 21 and 24 to flip the multivibrator from one stable condition to another. The trigger circuits of the binary counter of the invention are responsive to negative pulses only and do not respond to positive pulses. This insensibility to positive pulses is accomplished by choosing circuit constants which require a greater voltage to be utilized to drive the grid potential of a cut-off tube into the conducting region than is required to drive the grid of a conducting tube below cut-off. The values of the resistances of the voltage dividing networks are selected so that the grid of a conducting triode is maintained only slightly more positive than cut-off while the grid of a nonconducting triode is maintained relatively further from the cut-off voltage. When a positive pulse is improved across the resistance 20, the positive voltage is applied to the grids of both triodes of the stage. The grid of the conducting triode, e. g., 1A, being already positive, draws grid current, thus pulling down the potential rise, and the positive potential applied to the grid of triode 1B is insufficient to drive it above cut-off. The more positive of the grids of the triodes 1A and 1B dissipates more of the energy of a positive impulse so that the voltage rise in the grid of the other triode is less than if both grids were at high impedance. However, when a negative impulse is impressed across resistor 20, no grid current flows in the grid circuit of either triode 1A or 1B, and the negative pulse momentarily biases the grid of triode 1A beyond cut-off. Thus a positive pulse impressed across resistance 220 does not trigger the second bistable multivibrator stage.

Each trigger circuit, i. e., multivibrator stage, of the binary counter chain after the first is triggered by the stage immediately preceding it. The computer of the invention is adapted to accomplish reverse counting without change of coupling between stages, thereby allowing permanent capacitance coupling between stages. A condenser 30 couples the anode of the triode 1B of the first bistable multivibrator stage to the common resistance 220 in the grid circuits of the triodes 2A and 2B of the succeeding bistable multivibrator. The second trigger circuit is flipped from one stable condition to another when the triode 1B of the first bistable multivibrator stage goes from its cut-off to its conducting condition but is not triggered when this triode 1B goes from its conducting to its cut-off condition. Pulses impressed across the resistances 20, 220, or 420 to flip a stage from one stable condition to the other will be hereinafter in the specification and the drawing referred to as "A" pulses and a lead carrying such an impulse is referred to as "input A." The inputs A are used to couple between stages.

In order to accomplish substraction, triggering pulses are put into the stage at the junction of the common anode supply resistors 19, 219, and 419, with the resistances 21 and 24, 221 and 224, and 421 and 424 respectively. The leads connecting to these junctions are hereinafter referred to as inputs B–1, B–2, and B–4 respectively, and the trigger pulses applied at these junctions are referred to as "B" pulses. It will be noted from Fig. 1 that each stage, with the exception of the first, is capable of being triggered from each of two separate circuits shown as input A and input B. It will also be noted that the first stage has both inputs A and B available for the sake of symmetry, but only input B–1 is used. Since triode 2A of the second bistable multivibrator stage is triggered on only the A pulses of negative polarity impressed across the resistor 220, the second stage flips whenever the triode 1B goes from cut-off to conducting, or on every second trigger pulse into the first multivibrator. Similarly, triode 4A of stage 4 will be triggered every second time the triode 2B flips, or every fourth time the first stage is triggered. In a counter of more than three stages of bistable multivibrators, triode 4B provides a negative pulse to a following stage every eighth time the first bistable multivibrator is triggered.

The cut-off or conducting condition of the triodes of each stage of the 3-stage binary counter of the preferred embodiment of the invention during forward counting is shown in the table of Fig. 3. If it is assumed that the counter is in the 0 position when all the triodes 1B, 2B, and 4B are conducting and the triodes 1A, 2A and 4A are cut-off, the counter of Fig. 2 will count forward eight counts to return the counter to its original condition with the conducting or cut-off status of each triode indicated at each count in Fig. 3. The symbol "0" signifies that a triode is conducting; the symbol "X" signifies that the corresponding triode is cut-off. It will be noted that triode 1B is cut-off at counter positions 1, 3, 5, and 7 and goes from the cut-off to the conducting condition when the first stage is pulsed to send a pulse of negative polarity through the condenser 30 to trigger the second stage. Similarly, at counter positions 3 and 7, the triode 2B goes from the cut-off to the conducting condition when the first stage is pulsed to send a negative pulse through the condenser 230 to trigger the third stage of the counter. After eight counts, the status of the stages is again exactly the same as it was at the 0 condition. Thus, an addition of eight pulses leaves no net effect on the counter, while an addition of seven pulses leaves the 3-stage counter one count short of its original status and is thus the equivalent of subtracting one count.

The preferred embodiment of the invention effectively subtracts by the addition of a number one less than capacity as disclosed in my aforementioned cofiled application, but does so in an entirely different manner and at much higher speed. To accomplish subtraction, every stage in the binary counting chain of the preferred embodiment of the invention is pulsed once and the circuit is allowed to reach equilibrium. If the input B pulses do not arrive at any specific stage at the same time that an "input A," or carry-over pulse, arrives from the preceding stage, the equilibrium condition of the counter represents a count one less than before all the stages are pulsed.

Figure 4:
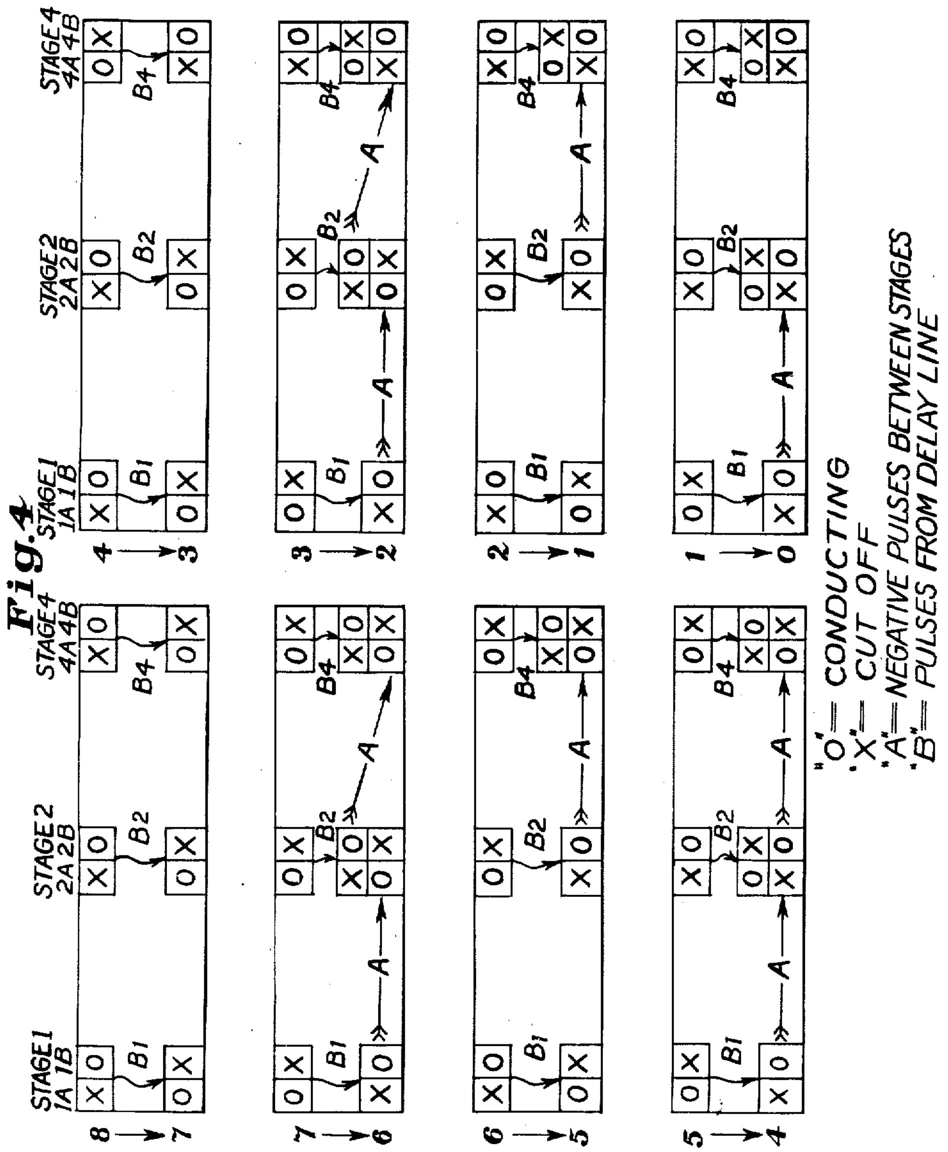
Fig. 4 is a table schematically illustrating the status of the stages during reverse counting.

Fig. 4 is a table schematically illustrating the cut-off or conducting condition of the triodes during the backcount operation. The symbol "0" again signifies that the triode is conducting; the symbol "X" again signifies that the corresponding triode is cut off. The B trigger pulses are those which initially are applied over the leads B–1, B–2, and B–4 to initially reverse all of the stages, while the A pulses are those coupled by condensers 30 and 230 between the stages.

Delay means are provided in the computer of the invention to prevent jamming of pulses by the simultaneous arrival of an A and a B pulse at any one stage during the backcount. Each bistable multivibrator stage with the exception of the first can be pulsed from two sources, i. e., over input A and input B, and these trigger pulses must be separate and distinct. As can be readily seen from Fig. 4, no trouble is encountered in counting backward from 8(0) to 7 since each stage is merely reversed by its appropriate B pulse. Counting backward from 7 to 6 is more difficult since both stages 2 and 4 are pulsed twice. After stages 1, 2, and 4 are all triggered by the initial series of B pulses, stage 2 flips stage 4 and stage 1 flips stage 2. To assure that the secondary (or carry-over) (A) pulses between stages occur a finite time after the initiating (B) pulses, a backcount triggering delay circuit portion of the computer is provided to sequentially delay the triggering of the stages. This backcount delay circuit of the preferred embodiment of the invention which may be more clearly seen by reference to Fig. 5, is adapted to sequentially produce a plurality of output pulses separated by fixed time intervals when pulsed by a single input impulse. From a single input pulse over the Up input channel 40, this circuit triggers the bistable multivibrator stages sequentially and at such intervals as to prevent interference between the A (or carry-over) impulses between stages and the initiating trigger B pulses. Preferably, the last of the cascaded stages is triggered first, and each stage is triggered before the stage immediately preceding it to assure that it has been initially flipped from its equilibrium position before the A impulse arrives from the previous stage to again cause a reversal from one stable condition to another.

The backcount delay circuit comprises a plurality of cascaded triggering circuits, one associated with each state of the counting chain and each including a pentode biased beyond cut-off. Thus in the form shown, the delay circuit includes three pentodes, one associated with each bistable multivibrator stage of the counter. The pentodes of the triggering circuits in effect are connected in cascade so that each pulses the succeeding one but in a direction opposite to the forward counting direction of the counter. The pentodes have substantially identical circuits, and the triggering circuit associated with the last stage of the counter (which circuit is pulsed by an impulse over the Up input lead 40) will be detailed with the understanding that the succeeding circuits differ only where specifically designated. The method of assigning reference numerals utilized in the description of the counter circuit will be continued in describing the backcount delay circuit, i. e., the first digit of three-digit reference numerals indicates with which triggering circuit the part is associated, e. g., resistance 441 is a component of the pentode circuit associated with stage 4. The pentode 432 associated with the last stage in the counting chain, i. e., stage 4, is pulsed, or triggered, first and it in turn pulses the pentode 232 associated with the next-to-the-last stage of the counting chain. The pentode 432 is normally biased beyond cut-off by the connection of its grid through the resistance 433 to ground and the connection of its cathode to a 15-volt positive source of potential. A tap on a voltage dividing network including three serial resistances 35, 36, and 37 (see Fig. 1), connected between the 250-volt positive anode source and ground provides the 15-volt positive source for the cathode of the pentode 432. The anode of the pentode 432 is connected to the 250-volt positive anode power supply through the resistor 419 in series with a shaper circuit including a paralleled resistance 441 and capacitance 442. A lead connected to the junction of the resistance 419 with the resistance 441 and the capacitance 442 is the input B–4 to stage 4 of the counting circuit.

To accomplish subtraction, a single square wave pulse 43 over the Up input channel 40 is impressed through a condenser 44 upon the grid of the pentode 432 associated with the last stage of the counting chain. An R–C differentiator circuit including the capacitor 44 and resistance 43 differentiates the square wave input 43 and produces a wave form 45 at the grid of the pentode 432 which is characterized by a leading positive spike 46 and a trailing negative spike 47. This differentiating action is dependent upon the fact that the RC time constant determined by the capacitor 44 and the resistor 433 is short relative to the duration of the applied pulse 43. The charge on the capacitor 44 cannot change instantaneously but only at the rate established by this RC product. Since the condenser 44 and the resistance 433 act as a voltage divider, a portion of the applied pulse 43 which does not appear across the condenser 44, because of the time required for a change of charge, must appear across the resistance 433 and produces a positive and a negative spike 46 and 47 respectively at the leading and the trailing edges of the square wave pulse 43. Since the pentode 432 is normally biased beyond cut-off, it conducts plate current only when the positive spike 46 is impressed on the grid, i. e., from time A to time B. The negative lobe, or spike, 47 of the differentiated wave form only pushes the grid on the pentode 432 further into the nonconducting region and has no effect on the plate current. Initially the anode of the pentode 432 sees only the resistance 419 in the anode supply circuit since the resistance 441 is effectively short-circuited by the capacitance 442. A large negative spike 51 therefore appears in the output of the shaper circuit connected to the anode of the pentode 432 and consisting of the parallel-connected resistance 441 and capacitance 442. This negative spike 51 is transmitted over lead wire 52 (input B–4) as shown in Figs. 1 and 5 to trigger stage 4 of the counting chain and thus reverse it from one condition of stable equilibrium to another.

Similarly, in the case of the "2" stage, a negative, substantially rectangular pulse 53 at the anode of the pentode 432 having a duration from approximately time A to time B is coupled through the condenser 54 to the grid of the pentode 232 associated with bistable multivibrator stage 2. The condenser 54 and resistor 233 differentiate the negative pulse 53, producing at the grid of the pentode 232 a wave form 56 having a leading sharp negative spike 57 and a trailing sharp positive spike 58. Since the pentode 232 is normally biased beyond cut-off, the negative spike 57 occurring at time A merely drives the pentode 232 further into the conducting region and does not cause this pentode to conduct. The positive "overshoot" spike 58 lasting from time B to time C raises the grid of pentode 232 into the conducting region and thus causes this pentode to conduct. The substantially rectangular negative pulse 59 at the anode of the pentode 232 is shaped by the parallelled resistance 241 and capacitance 242 to produce a sharp negative spike 60 at time B which is fed over lead 62 (input B–2) to trigger the second bistable multivibrator stage of the counting chain and cause it to change from one stable condition to another. It will thus be noted that the last stage, i. e., stage 4, of the counting chain is triggered at time A while the second stage is not triggered until a finite interval later at time B.

In a similar manner, the substantially rectangular negative wave form 59 at the plate of the pentode 232 having a duration from time B to time C is transmitted through a condenser 64 and impressed across the resistance 33 upon the grid of the pentode 32. The condenser 64 and resistance 33 differentiate the negative pulse 59 and produce on the grid of the pentode 32 a wave form 69 having a leading negative peak 70 lasting from, time B to time C and a trailing positive peak 71 lasting from time C to time D. The leading negative peak 70 merely drives the cut-off pentode 32 further into the nonconducting region. The pentode 32 conducts plate current from time C to time D during the positive peak 71 producing a negative, substantially rectangular pulse 73 at the anode thereof. In a manner hereinbefore explained, the shaper circuit consisting of the parallel connected resistance 41 and capacitance 42 delivers a sharp negative spike output pulse 74 over the lead 72 (input B–1) to trigger the first stage of the counting chain. It will be noted that this output spike occurs at time C which is a finite interval after the negative spike 60 is delivered over the wire 62 to trigger the second stage of the counting chain. A succeeding pentode triggering circuit similarly connected would deliver its pulse to trigger its associated counter stage at time D.

It will be seen from the above description that the B pulses for initially reversing each stage of the counter are delivered successively over the wires 52, 62 and 72 into the bistable multivibrator stages of the counter at inputs B–4, B–2, B–1 respectively as shown in Fig. 1. These triggering pulses are generated and delivered to counter stages 4, 2, and 1 at times A, B, and C respectively. The last stage of the counter, i. e., stage 4, is flipped at time A and is ready to be flipped again when an A pulse arrives from the next-to-the-last stage at time B or time C (see Fig. 4). Similarly, bistable multivibrator stage 2 of the counter is flipped at time B and is ready to be flipped again when an A pulse arrives from the first stage at time C. On proper input pulses the counting chain of Fig. 2 and the backcount triggering delay circuit of Fig. 5, when combined as shown in Fig. 1, counts backwards as diagrammed in Fig. 4. This sequential and delay triggering of the counting chain stages is accomplished by a single input pulse over the Up input channel 40 impressed through the condenser 44 on the grid of the pentode 432 associated with the last bistable multivibrator stage.

Counting in the forward direction is accomplished by triggering the first stage of the counting chain at either input A or input B–1. In the preferred embodiment of the invention shown in Figs. 1 and 5, a triggering pulse over the Down input channel 78 is transmitted through a condenser 80 onto the grid of a pentode 81 to cause the counter to count forward. As hereinbefore explained, the pentode circuit associated with the first stage of the counting chain includes a shaper circuit consisting of a parallel-connected resistance 41 and condenser 42 in the anode circuit of the pentode 32. This same shaper circuit is utilized in forward counting to deliver a sharp negative spike over the lead 72 whenever a triggering impulse over a Down input channel 78 is impressed on the grid of the pentode 81. The anode of the pentode 81 is connected directly to the anode of the pentode 32 by a lead 84 (shown in dotted lines in Fig. 5). Each time the pentode 81 is caused to conduct by an impulse over the Down input channel 78, a sharp spike pulse is delivered from the shaper circuit over the lead 72 to trigger the first stage of the counting chain.

It is apparent that the computer of the invention is not limited to a counting chain of three stages as illustrated in the drawings and as herein described, but may consist of any desired number of stages. I have constructed a computer comprising six stages of bistable multivibrators using 2C51 twin triodes in the counting chain and 6AK5 pentodes in the backcount triggering delay circuit which counts at high speeds in both forward and backward directions between 0 and 64. The computer of the preferred embodiment of the invention is adapted to accomplish the back count in a maximum of 0.3 millisecond. Although component values are not critical, the best results are obtained if the coupling condensers 44, 54, and 64 are equal in value, or decrease in capacitance in the order named.

Pulses over the Down input channel 78 cause the computer to count forward (0-1-2-3, etc.) and pulses over the Up input channel 40 cause the computer to count backwards (0-7-6-5, etc.). The conducting or cut-off condition of the triodes of the stages is indicative of the difference between the number of pulses received over the Up and the Down input channels 40 and 78. In the preferred embodiment of the invention it is desired that an output pulse be provided when either input exceeds the other by three pulses, i. e., when (Up-Down=3) or when (Down-Up=3). When (Down-Up=3) the computer is at count 3, and when (Up-Down=3) the computer is at count 5 (−3). A circuit adapted to detect these two conditions is disclosed in my aforementioned cofiled application and again in Fig. 6. It will be noted from Fig. 3 that at counter position 3 the triodes 1B, 2B, and 4A are cut-off. The anodes of these three triodes 1B, 2B, and 4A are connected to a common Down bus 90 through resistances 91, 92, and 93 respectively. A Down detecting triode 94 and an Up detecting triode 95 are contained within a single twin triode tube 96. The potential of the Down bus 90 is the average value of the voltage of the plates of the three triodes 1B, 2B, and 4A and is conected to the grid of the Down detecting triode 94. When the three applicable triodes 1B, 2B, and 4A are cut off, the voltage of the Down bus 90 is a maximum, but if any of these triodes is conducting, the potential of the bus 90 is less than the maximum. A tap on the voltage dividing network comprising the serial resistances 35, 36 and 37 (see Fig. 1) connects a 175-volt positive source of potential to the cathode of the triode 94. This 175-volt positive source is represented by the dotted line 97 in the box diagram 98. The stepped line 99 in the box diagram 98 is a graph of the potential assumed by the Down bus 90 at each position of the counter. It will be apparent that the triode 94 can conduct when, and only when, the counting chain stages indicates a count of 3, at which time the voltage of the Down bus 90 is a maximum. The grid of triode 94 is only in the conducting region when the computer has reached the count of 3; at any other count the grid of the triode 94 is below the cut-off potential. At counter position 3 the triode 94 conducts heavily and operates the relay 100. Relay 100 in operating closes its normally open contacts 101 and 102 which connects a 150-volt negative pulse from the lead 103 over the Down output channel 104. It is thus apparent that an impulse is delivered over the Down output channel 104 whenever the number of impulses received over the Down input channel 78 exceeds by three the number of pulses received over the Up input channel 40, i. e., when (Down-Up=3). In addition, relay 100 opens the normally closed contacts 106 and 107, which in turn open the cathode circuits of the triodes 1A, 2A, and 4A, and thus resets the computer to 0 where it is ready for another computation.

In a similar manner it will be noted from Fig. 3 that at counter position 5 (−3) triodes 1B, 2A, and 4B are cut off. The anodes of these three triodes 1B, 2A, and 4B are connected through resistances 110, 111, and 112 respectively to a common Up bus 114. The potential of the Up bus 114 is the average value of the voltages of the plates of the three triodes 1B, 2A, and 4B, and is connected to the grid of the Up detecting triode 95. The dotted line 118 in the block diagram 119 again schematically represents the positive voltage at which the cathode of the triode 95 is maintained, while the stepped line 120 schematically represents the voltage of the Up bus 114 at each count. It will be noted that the grid of the Up detecting triode 95 is more positive than its cathode only at counter position 5 (−3). When the number of impulses received over the Up input channel 40 exceeds by three the number of impulses received over the Down input channel 78, the binary counter counts to position 5, allowing Up detecting triode 95 to conduct heavily and operate a relay 125 in the plate circuit thereof. In operating, the relay 125 closes its springs 130 and 131 to send a 150-volt negative pulse from the lead 132 over the Up output channel 133, and, in addition, opens the relay springs 137 and 138 to open the cathode circuits of the triodes 1A, 2A, and 4A and thus reset the computer to 0.

It is apparent that the computer of the invention delivers an output signal over the Down output channel 103 or the Up output channel 133 whenever a differential of 3 is accumulated and that this signal is delivered over the Down output channel 103 or the Up output channel 133 depending upon whether three more impulses have been received over the Up input channel 40 or the Down input channel 78.

I claim:

1. In a reversible electronic digital computer including a plurality of cascaded bistable multivibrators for counting forward on pulses over a first input channel and backward on pulses over a second input channel and in which the backward count is accomplished by triggering all of said multivibrators during the interval between successive pulses over said first input channel, a plurality of cascaded triggering circuits, one for each multivibrator, each including an electron discharge tube having an anode, a cathode, and a control grid, means for applying operating potentials thereto, and means for biasing said tubes beyond cutoff, each of said tubes being adapted when pulsed to trigger its associated multivibrator, means coupling the anode of each tube to the control grid of the succeeding tube for differentiating a negative pulse into a pulse having a leading negative lobe and a trailing positive lobe, said second input channel being coupled to the control grid of the tube of the first of said triggering circuits, whereby when the tube of the first of said cascaded triggering circuits is pulsed by a pulse over said second input channel a negative pulse is produced at the anode thereof and the succeeding tube is unaffected by said negative lobe and is pulsed only by said trailing positive lobe for obtaining a time delay between the triggering of successive multivibrators.

2. An electronic differential binary computer comprising a plurality of successive units operable either to a binary one or to a binary zero condition, transfer means between units, each unit being operable in response to an alternation of the preceding unit from one condition to the other and unresponsive to the opposite alternation, a first input channel coupled to the first of said units whereby said computer counts forward on pulses over said first channel, a plurality of cascaded triggering circuits, one associated with each unit, with the first triggering circuit associated with the last of said units and with the triggering circuits successively operable in a direction opposite to the forward counting direction of said units, each triggering circuit being adapted when pulsed to trigger its associated unit and to pulse the succeeding triggering circuit, a second input channel, means for pulsing the first of said cascaded circuits once for each pulse over the second input channel during the interval between successive pulses over said first input channel, and means for preventing interference between operating pulses transferred between successive units and the triggering pulses delivered from the triggering circuits to their associated units.

3. An electronic defferential binary computer comprising a plurality of successive units each including a pair of electron discharge tubes having anode and control electrodes and operable to produce potentials representative of either of two digits, means between units coupling the anode of a tube of one unit to the control electrodes of the tubes of a succeeding unit, each of said units being operable by an alternation of the previous unit from one potential to the other but being unresponsive to the opposite alternation, a first input channel coupled to the first of said units whereby said computer counts forward on pulses over said first channel, a second input channel, and means for triggering all of said units once for each pulse over said second channel during the interval between successive pulses over said first input channel to cause said computer to count backwards including a plurality of cascaded triggering circuits, one associated with each unit and each adapted when pulsed to trigger its associated unit and to pulse the succeeding triggering circuit, said second input channel being coupled to the first of said triggering circuits, and means for delaying the successive pulsing of said triggering circuits.

4. An electronic differential computer in accordance with claim 3 and including means utilizing said representative potentials for detecting when said computer has counted to any predetermined count within its range.

5. An electronic differential computer in accordance with claim 4 and including an output channel and means controlled by said detecting means for impressing a signal on said output channel.

6. An electronic differential computer in accordance with claim 4 and including means actuated by said detecting means for resetting the computer to zero.

7. An electronic digital computer for computing the difference in the number of pulses over two input channels comprising a plurality of bistable multivibrators having the first stage thereof operatively connected to one of said input channels, means for triggering a succeeding stage only when the preceding stage goes from the first to the second state, whereby said computer has a binary capacity of $2^n$ where $n$ is the number of multivibrator stages, and means for triggering the first of said stages once for each pulse over said one input channel, and a plurality of cascaded trigger circuits, one of said trigger circuits being associated with each of said multivibrator stages, arranged in inverse sequence with respect to said multivibrators and having the first unit thereof operatively connected to the other of said input channels for successively triggering all of said multivibrators once for each pulse over said other input channel during the interval between successive pulses over said one input channel.

8. An electronic digital computer in accordance with claim 7 and including means responsive to the bistable multivibrators for detecting when said computer reaches any predetermined count with respect to either of said input channels.

9. An electronic digital computer in accordance with claim 7 and including an output channel representative of each of said input channels, and means associated with said bistable multivibrators for providing a pulse on the respective output channel indicative of the input channel first attaining a predetermined count.

References Cited in the file of this patent

UNITED STATES PATENTS

| | | |
|---|---|---|
| 2,402,916 | Schroeder | June 25, 1946 |
| 2,494,339 | Keister | Jan. 10, 1950 |
| 2,521,774 | Bliss | Sept. 12, 1950 |
| 2,563,841 | Jensen | Aug. 14, 1951 |
| 2,572,891 | Smith | Oct. 30, 1951 |
| 2,574,283 | Potter | Nov. 6, 1951 |
| 2,591,931 | Grosdoff | Apr. 8, 1952 |
| 2,703,678 | Hopkins et al. | Mar. 8, 1955 |
| 2,719,670 | Jacobs et al. | Oct. 4, 1955 |

U. S. DEPARTMENT OF COMMERCE

PATENT OFFICE

CERTIFICATE OF CORRECTION

Patent No. 2,813,678 November 19, 1957

Dwight D. Wilcox, Jr.

It is hereby certified that error appears in the printed specification of the above numbered patent requiring correction and that the said Letters Patent should read as corrected below.

Column 3, line 35, strike out "portion", second occurrence; column 4, line 35, for "improved" read -- impressed --; column 6, line 70, for "resistance 43" read -- resistance 433 --; column 7, line 45, for "parallelled" read -- paralleled --; column 10, line 46, after "channel" insert -- whereby said computer counts backward --.

Signed and sealed this 6th day of May 1958.

(SEAL)
Attest:

KARL H. AXLINE
Attesting Officer

ROBERT C. WATSON
Commissioner of Patents